(12) United States Patent
Fursdon et al.

(10) Patent No.: US 6,276,671 B1
(45) Date of Patent: *Aug. 21, 2001

(54) HYDRAULICALLY DAMPED MOUNTING DEVICE

(75) Inventors: Peter Michael Trewhella Fursdon, Bradford-on-Avon; John Philip West, Newark, both of (GB)

(73) Assignee: Avon Vibration Management Systems Limited, Wiltshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,751

(22) Filed: Oct. 29, 1998

(51) Int. Cl.[7] ........................................ F16F 5/00
(52) U.S. Cl. ...................... 267/140.12; 267/293
(58) Field of Search .................... 267/140.12, 140.11, 267/141.2, 141.3, 141.4, 292, 293; 248/562, 636

(56) References Cited

U.S. PATENT DOCUMENTS

| | | |
|---|---|---|
| 4,786,036 | 11/1988 | Kanda . |
| 4,896,868 * | 1/1990 | Thelamon et al. ............... 267/140.12 |
| 4,971,456 | 11/1990 | Hori . |
| 4,982,938 | 1/1991 | Brenner . |
| 5,013,012 * | 5/1991 | Jouade ........................... 267/140.12 |
| 5,123,633 | 6/1992 | Kanda . |
| 5,184,803 | 2/1993 | Tanabe et al. . |
| 5,299,788 * | 4/1994 | Kanda ............................. 267/140.12 |
| 5,509,643 * | 4/1996 | Carstens et al. ................ 267/140.12 |
| 5,516,083 | 5/1996 | Sprang et al. . |
| 5,711,513 * | 1/1998 | Bretaudeau et al. ............ 267/140.12 |

FOREIGN PATENT DOCUMENTS

| | | |
|---|---|---|
| 3810310 | 8/1990 | (DE) . |
| 41 16 706 A1 | 11/1991 | (DE) . |
| 43 32 367 C2 | 3/1995 | (DE) . |
| 0 248 714 A1 | 12/1987 | (EP) . |
| 0172700 | 11/1988 | (EP) . |
| 0335007 | 10/1989 | (EP) . |
| 0418671 | 3/1991 | (EP) . |
| 0335005 | 6/1992 | (EP) . |
| 1242965 | 8/1971 | (GB) . |
| 2193553 | 2/1988 | (GB) . |
| 2195166 | 3/1988 | (GB) . |
| 2291691 | 1/1996 | (GB) . |
| 2298018 | 8/1996 | (GB) . |
| 2298019 | 8/1996 | (GB) . |

* cited by examiner

Primary Examiner—Matthew C. Graham
Assistant Examiner—Pamela J. Rodriguez
(74) Attorney, Agent, or Firm—Cook, Alex, McFarron, Manzo, Cummings & Mehler, Ltd.

(57) ABSTRACT

A bush-type hydraulically damped mounting device has two telescoped anchor parts. Resilient walls, spaced apart axially, extend between the anchor parts. Deformable walls, spaced apart circumferentially, extend axially between the resilient walls, to define first and second chambers for hydraulic fluid. The deformable walls make abutting unbonded contact with one or other of the anchor parts.

8 Claims, 4 Drawing Sheets

HYDRAULICALLY DAMPED MOUNTING DEVICE

BACKGROUND OF THE INVENTION

1. Field of the Invention

The present invention relates to a hydraulically damped mounting device. Such a mounting device usually has a pair of chambers for hydraulic fluid, connected by a suitable passageway, and damping is achieved due to the flow of fluid through that passageway.

2. Summary of the Prior Art

In EP-A-0172700, a hydraulically damped mounting device of the "bush" type was disclosed which damped vibration between two parts of a piece of machinery, e.g. a car engine and a chassis. In a bush type of hydraulically damped mounting device, the anchor for one part of the vibrating machinery is in the form of a hollow sleeve, and the other anchor part is in the form of a rod or tube extending approximately centrally and coaxially of the sleeve. Resilient walls then interconnect the central anchor part and the sleeve to act as a resilient spring for loads applied to the mounting device. In EP-A-1072700, the resilient walls also defined one of the chambers (the "working chamber") in the sleeve, which chamber was connected via the elongate passageway to a second chamber (the "compensation chamber") bounded at least in part by a bellows wall which was effectively freely deformable so that it could compensate for fluid movement through the passageway without itself resisting that fluid movement significantly.

In GB-A-2291691, the arrangement disclosed in EP-A-1072700 was modified by providing a bypass channel from the working chamber to the compensation chamber. Under normal operating conditions, that bypass channel was closed by part of the bellows wall bounding the compensation chamber. At high pressures, however, the bellows wall deformed to open the bypass channel, thereby permitting fluid from the working chamber to pass directly into the compensation chamber without having to pass through the full length of the passageway.

In both EP-A-1072700 and GB-A-2291691, the resilient walls extended generally axially along the interior of the mount. Those walls therefore formed axially elongate blocks of e.g. rubber material which were configured to achieve the desired static spring requirements. The material of the block was deformed primarily in shear, to give maximum durability. As the resilient walls also formed walls of the working chamber, the axial ends of the working chamber were closed with material being integral with the resilient walls. In practice, however, the spring effect of those ends walls was small, so that the spring characteristic of the mount could be determined by the axially extending resilient walls.

SUMMARY OF THE INVENTION

The present invention departs from this, by locating the resilient walls at axially spaced apart locations. This is thus a departure from the arrangements in EP-A-1072700 and GB-A-2291691, in which the main spring effect is provided by axially extending, circumferentially spaced, resilient walls. The resilient walls of the present invention thus define an enclosed space within the sleeve which extends circumferentially around the central anchor part, which space is axially bounded by the resilient walls.

It is then necessary to divide that space into two chambers, and connect those two chambers with a passageway, to form the hydraulic mounting device of the bush type. To provide that division, the present invention proposes that axially extending walls extend between the central anchor part and the sleeve. Unlike the axially extending walls of the known arrangements, those walls do not need to provide a spring effect, since the spring effect is provided by the axially spaced resilient walls. Therefore, it is not necessary for those axially extending walls to be bonded to the sleeve and/or central anchor part. Instead, they may make abutting, un-bonded, contact.

This is significant, because it then permits a bypass to be formed between the chambers without the need for a separate bypass channel, as in GB-A-2291691. By suitably selecting the abutment force of the axial walls against the sleeve and/or central anchor part, a pressure-sensitive seal is achieved. For pressures below a suitable level, the integrity of that seal will be achieved by the force of abutment. For higher pressures, however, the seal will be broken, thereby providing a path around the axial walls between the two chambers.

A further advantage of this arrangement is that tensile stresses are less likely to occur in the axial extending walls. In known hydraulically damped mounting devices of the bush type, there is a risk that the resilient walls may be put under tensile stress at their bonding to the sleeve so reducing durability of the mounting device. Since the axially extending walls are not bonded to the sleeve, in the present invention, such tensile stresses cannot occur and thus the durability is improved.

Thus, the present invention may provide a hydraulically damped mounting device having a first anchor part;

a second anchor part in the form of a hollow sleeve containing the first anchor part, such that the first anchor part extends axially of the sleeve;

first and second resilient walls interconnecting the first and second anchor parts, the first and second resilient walls being spaced apart so as to define an enclosed space within the sleeve extending circumferentially around the first anchor part and axially bounded by the first and second resilient walls; and first and second deformable walls, each extending axially between the first and second resilient walls at circumferentially spaced locations, so as to divide the enclosed space into first and second chambers for hydraulic fluid; and a passageway interconnecting the first and second chambers for flow of hydraulic fluid therethrough;

wherein the first and second deformable walls each have an edge forced into abutting, unbonded contact with the sleeve or first anchor part. Thus the axial walls can form seals between said first and second chambers below a predetermined pressure of hydraulic fluid, the seals being released at pressures above the predetermined pressure.

Preferably, the resilient walls are in the shape of hollow frusto-cones, with their frustums at the central anchor part and their bases at the sleeve. The resilient walls thus operate in shear under load. They preferably extend substantially completely around the central anchor part.

It may be noted that, with the present invention, it is not necessary to provide a bellows wall to bound one of the chambers. Instead, each chamber is axially bounded by a part of the resilient walls, and the two chambers separated by the axial walls. It is, however, possible for only one of the chambers (the working chamber) to be bounded in this way and the other chamber to be bounded by a compensation chamber, as in EP-A1072700 and GB-A-2291691.

Although it is possible for the axial walls to be simple flaps, it is preferable for them to be hollow and more preferably with a V-shaped cross section, with the base of the "V" being in contact with the sleeve. Providing such hollow axial walls allows tuning of the dynamic stiffness of the mount independent of the static stiffness. Where the axial walls are hollow in this way, it may be necessary to provide voids in the resilient walls at the point where those resilient walls meet the axial walls.

The hydraulic mounting device may also be formed such that the first anchor part is offset transversely from the longitudinal axis of the second anchor part. This permits the hydraulic mounting to bear greater loads in certain transverse directions.

BRIEF DESCRIPTION OF THE DRAWINGS

Embodiments of the present invention will now be described in detail, by way of example, with reference to the accompanying drawings, in which.

DETAILED DESCRIPTION

Figure 1:
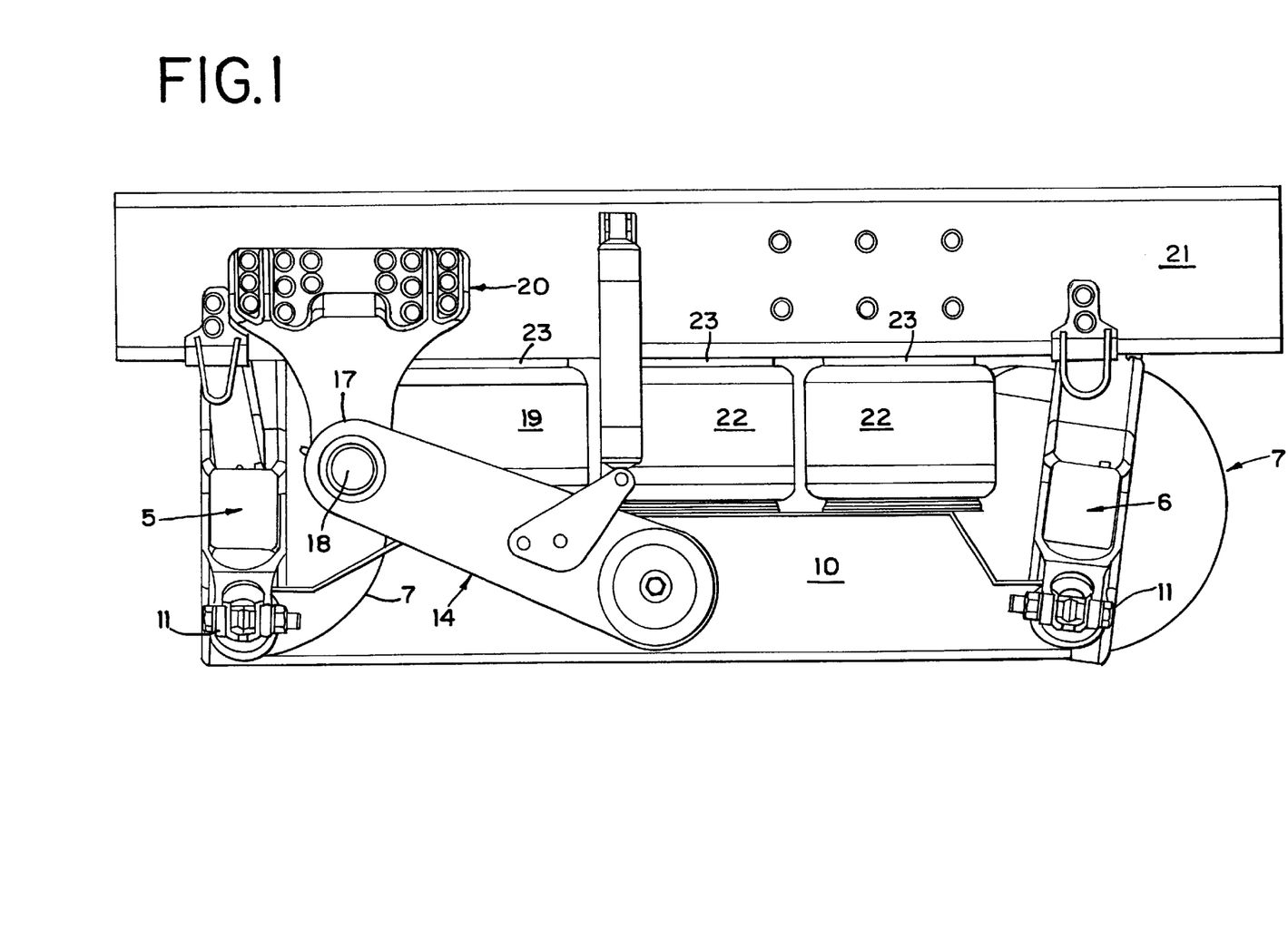
FIG. 1 is a longitudinal sectional view through a first embodiment of a hydraulically damped mounting device according to the present invention.

As can be seen from FIG. 1, an embodiment of the present invention is in the form of a "bush" type mount in which a central anchor part 10 is located within a sleeve 11 forming a second anchor part, to which one part of vibrating machinery may be attached. The central anchor part 10 has a bore 12 to which another part of the vibrating machinery may be attached. The central anchor part 10 has a projecting wings 13 from which extend resilient walls 14,15. The resilient walls 14,15 extend circumferentially around the central anchor part 10, and thus are generally in the shape of hollow frusto-cones with their frustums at the ridge 13 of the central anchor part 10, and their bases in contact with rings 16,17 which are secured to the sleeve 11. The inclined shape of the resilient walls 14,15 therefore defines an enclosed space 18 within the sleeve 11. That space 18 is axially bounded by the resilient walls 14,15, radially bounded outwardly by the sleeve 11, and radially bounded inwardly by the central anchor part, including parts of the projecting wings 13 of the central anchor part 10.

In order for the hydraulically damped mounting device to act as such, it is necessary for the space 18 to be divided into two chambers for hydraulic fluid. When those two chambers are connected by a suitable passageway, hydraulic fluid flows through the passageway from one chamber to the other as the mount vibrates, thereby to damp the vibration.

Figure 2:
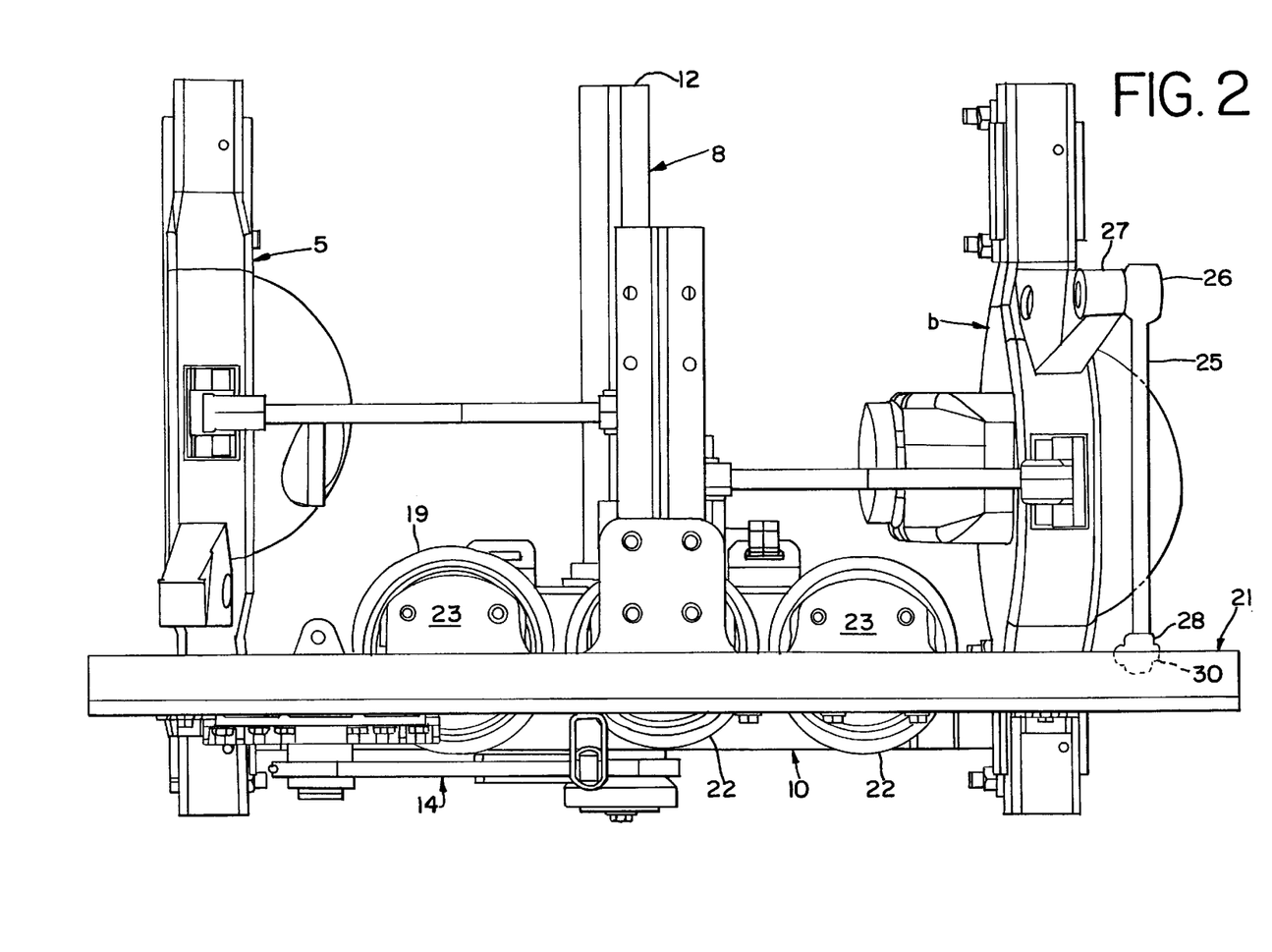
FIG. 2 is a transverse sectional view along the line A to A in FIG. 1.

In the present embodiment, and as shown in FIG. 2, such division is achieved by flaps forming axially extending walls 20,21 which extend axially between the resilient walls 14,15 at circumferentially spaced locations (radially opposite in this embodiment), and thus divide the space 18 into two chambers 22,23. Those chambers 22,23 are then interconnected by a passageway 24 (see FIG. 1). Although not shown in FIG. 1, the passageway 24 opens into the two chambers 22, 23, respectively. Although this is not visible in FIG. 2, the chambers 22,23 are axially bounded by the resilient walls 14,15 because those walls axially bound the space 18. Each wall 14,15 axially bounds both chambers 22,23. The chambers 22,23 are filled with hydraulic fluid.

Consider now vibration of the central anchor part 10 downwardly in FIGS. 1 and 2, relative to the outer sleeve 11. That movement reduces the volume of chamber 22 and so hydraulic fluid is forced from the chamber 22 through the passageway 24 to the chamber 23. That fluid movement through the passageway 24 damps the vibration. A similar effect is achieved when the central anchor part 10 vibrates inwardly, with fluid passing from the chamber 23 to the chamber 22. In each case, the resilient walls 14,15 deform, primarily under shear, to act as a spring for the vibration. This is similar to the effect in known hydraulically damped mounting devices of the "bush" type, except that resilient walls 14,15 axially bound the chambers 22,23. In known hydraulically damped mounting devices, the resilient walls extend axially along the sleeve 11, and thus are generally in the location of the axial walls 20,21 in FIG. 2.

In this embodiment, although the axial walls 20,21 are bonded to the wings 13 of the central anchor part 10, they are not bonded to the sleeve 11. Instead they are shaped so that they are forced into abutting contact with the sleeve. The force of abutment is predetermined so that, under normal operating conditions, the force of abutment exceeds any force applied to the axial walls 20,21 by fluid pressures in the chambers 22,23, so that the abutment forms a seal at the sleeve 11. Under such conditions, the only way for fluid to pass between the chambers 22 and 23 is via the passageway 24.

However, if the pressures in the chambers 22,23 exceed predetermined values, which may occur under very high loads, the forces applied to the axial walls 20,21 by the fluid pressures in the chambers 22,23 will be sufficient to overcome the force maintaining the seal between the axial walls 20,21 and the sleeve 11. The edges of the axial walls 20,21 will be forced away from the sleeve 11, thereby creating a bypass route between the chambers 22,23 between the edge of the axial walls 20,21 and the sleeve 11. Thus, extreme overpressure, which may damage the mount, can be avoided.

It should be noted that this embodiment has an arrangement in which the axial walls 20,21 are not bonded to the sleeve 11, but are bonded to the wings 13 of the central anchor part. It would also be possible to have an arrangement in which the axial walls 20,21 are bonded to the sleeve, but not the ridges 13, or even not bonded to either the wings 13 or the sleeve 11, provided that the positions of the axial walls 20,21 could be suitably maintained by their bonding to the resilient walls 14,15.

Figure 3:
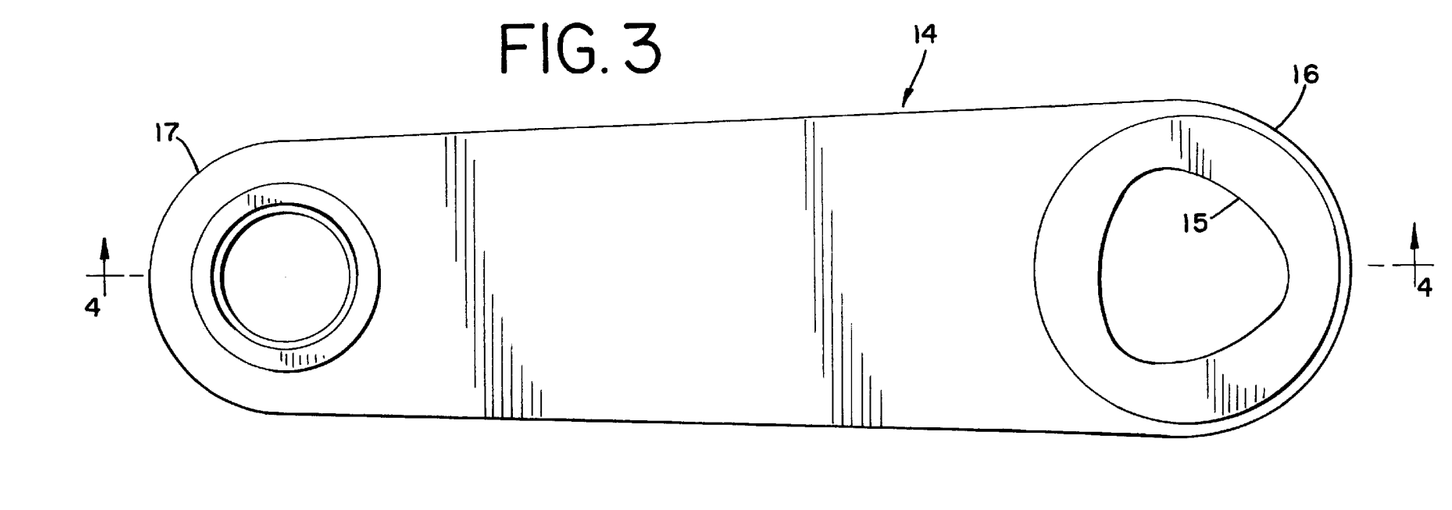
FIG. 3 is a perspective view of the hydraulically damped mounting device of FIG. 1 with the sleeve removed.

That attachment of the resilient walls 14,15 and the axial walls 20,21 is shown more clearly in FIG. 3. As can be seen from FIG. 3, the axial extent of the axial walls 20,21 (only wall 21 is visible in FIG. 3) increases with increasing distance from the ridge 13 so as to extend between the resilient walls 14,15. The outer edge of the deformable wall 20,21 shown at 30 in FIG. 3, is then in abutting contact with the sleeve 11 (which is not shown in FIG. 3 for the sake of clarity).

Figure 4:
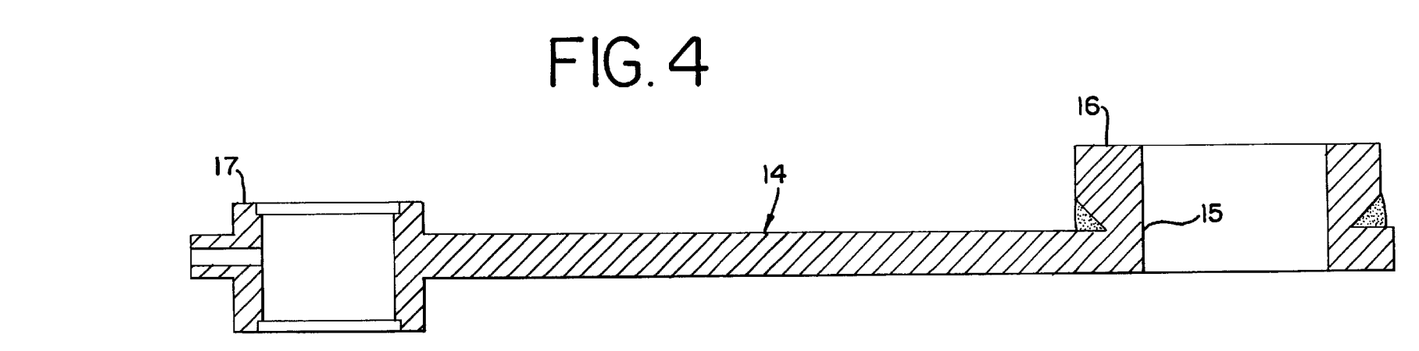
FIG. 4 is a longitudinal sectional view through the hydraulically damped mounting device of FIG. 1, in a direction perpendicular to FIG. 1.

FIGS. 2 and 4 also show that the axial walls 20,21 are hollow and have voids 40,41 therein. These voids are referable, rather than essential, but enable the dynamic stiffness of the mount to be tuned independently of the static stiffness. Since it is preferable for the resilient walls 14,15 and the axial walls 20,21 to be integrally moulded, there will be voids 50,51 in the resilient walls 14,15 aligned with the voids 40,41 in the axial walls 20,21 as can be seen in FIG. 3. If such voids are provided, they then form gaps in the circumferential extent of the resilient walls 14,15 around the central anchor part 10. They do not significantly affect the spring characteristic of the mount, since the mount will normally be positioned so that the principal direction of vibration is perpendicular to the diameter joining those gaps 50,51 (i.e. vertically in FIGS. 1 and 2).

Figures 5, 6:
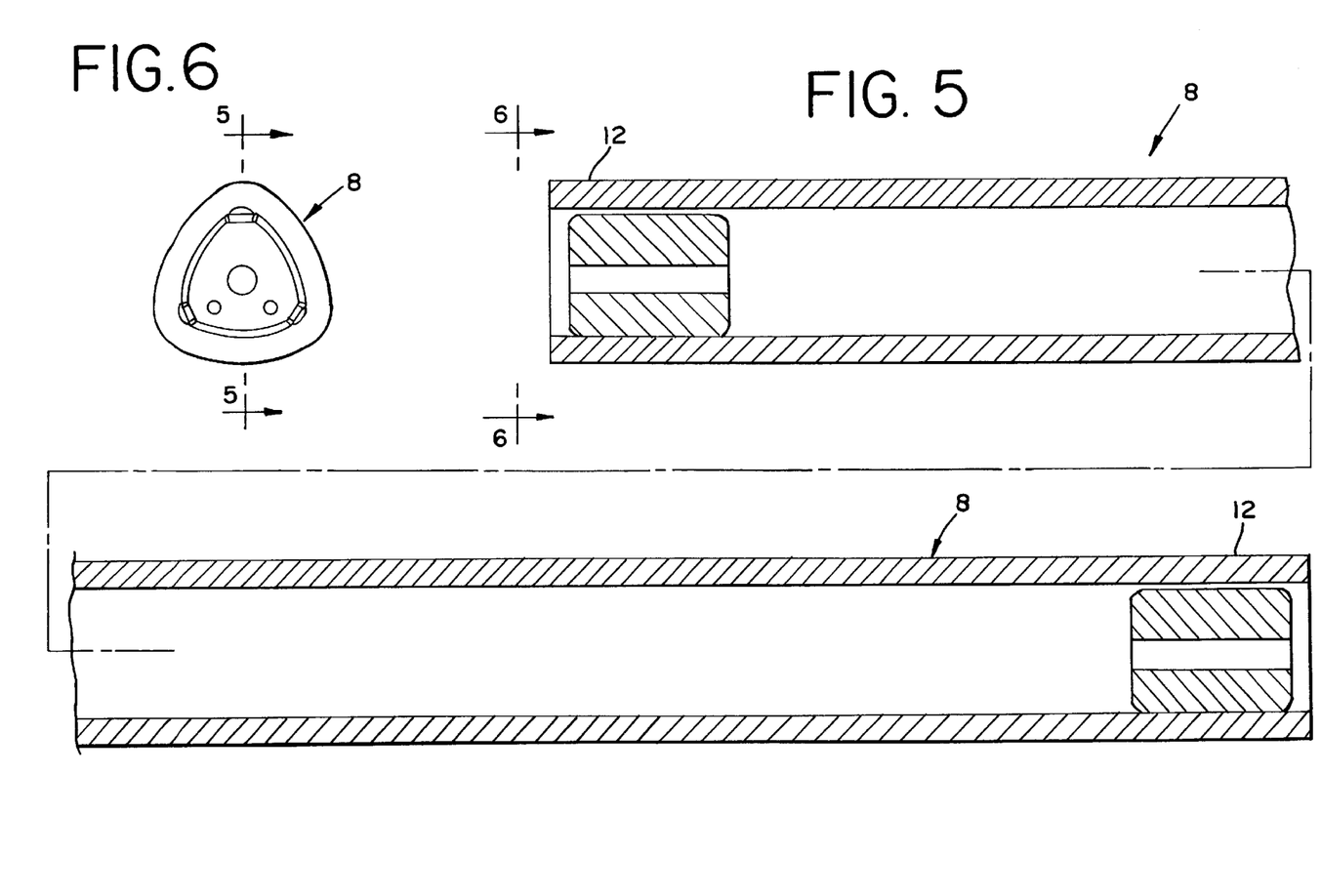
FIG. 5 is a longitudinal sectional view through a second embodiment of a hydraulically damped mounting device according to the invention.
FIG. 6 is an end view of the hydraulically damped mounting device of FIG. 5.
Figure 5:
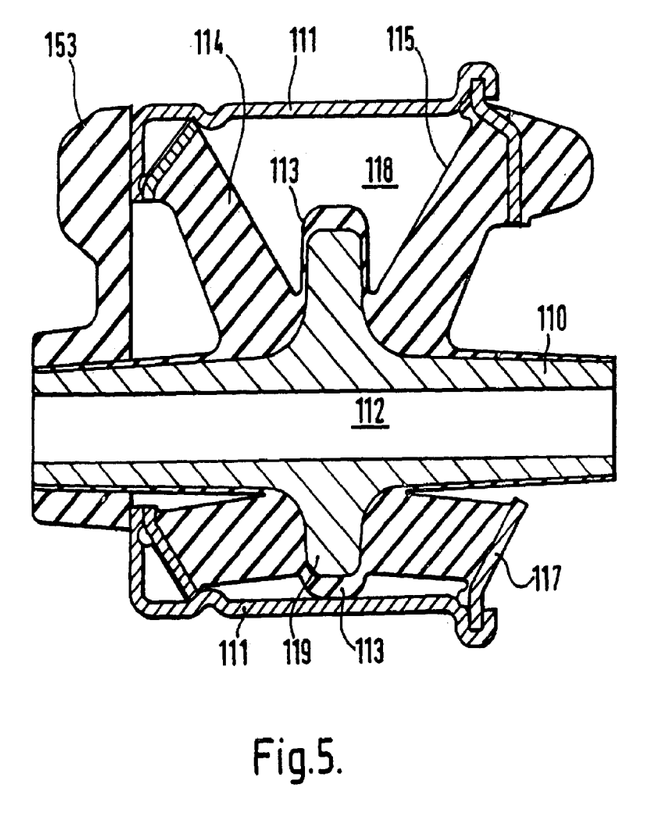
Figure 6:
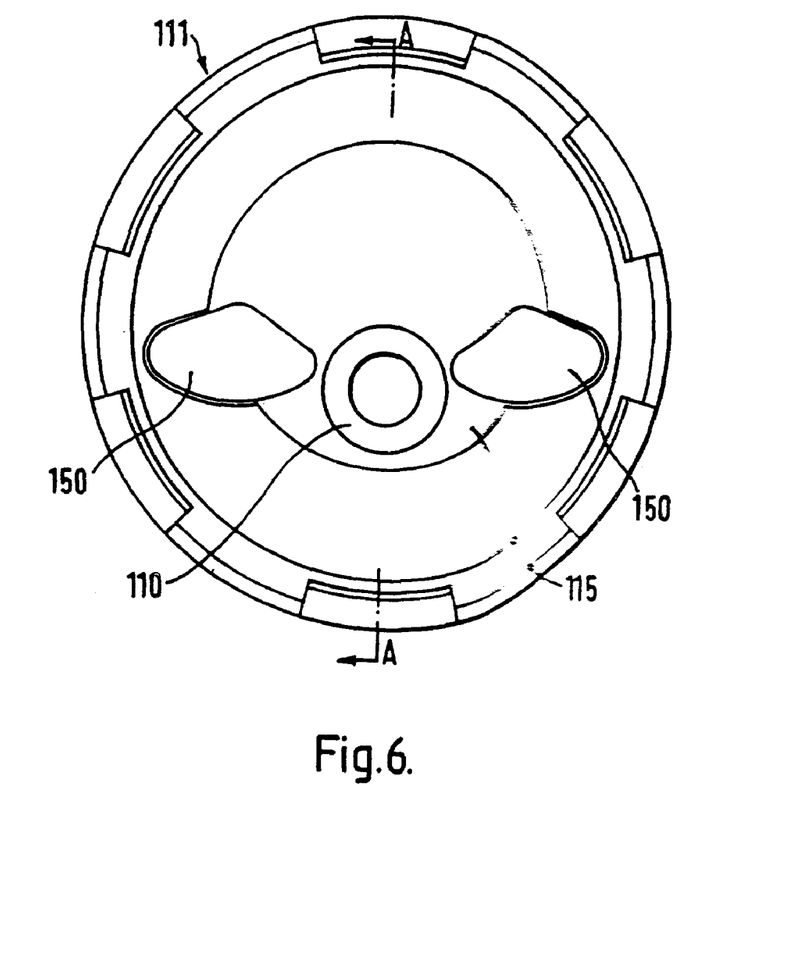

FIG. 5 shows a second embodiment of a hydraulically damped mounting device according to the invention in which the central anchor part 110 is displaced from the longitudinal axis of the sleeve 111 (downwardly in FIG. 5) so that the projecting wing 113 makes contact with the inner surface of the sleeve 111. The resilient walls 114, 115 are frusto-conical portions, not of a right circular cone, but of a cone having an apex displaced (downwardly in FIG. 5) from the central longitudinal axis of the sleeve 111.

The embodiment of FIG. 5 has the advantage that the mounting device is particularly able to bear loads which displace the central anchor part 110 towards the farther side of the sleeve (i.e. in the upward direction in FIG. 5).

In the second embodiment, the wing 113 is reinforced by a rib 119 extending radially from the central anchor part 110. A snubber 153 is located at one axial end of the sleeve 111.

FIG. 6 illustrates an end view of the embodiment of FIG. 5 as viewed from the right-hand side of FIG. 5. The view of FIG. 5 represents a cross-section of the mounting device along the plane A—A marked on FIG. 6. FIG. 6 illustrates gaps 150 in the resilient wall 115.

What is claimed is:

1. A hydraulically damped mounting device having
    a first anchor part;
    a second anchor part in the form of a hollow sleeve containing the first anchor part, such that the first anchor part extends axially of the sleeve;
    first and second resilient walls interconnecting the first and second anchor parts, the first and second resilient walls being spaced apart so as to define an enclosed space within the sleeve extending circumferentially around the first anchor part and axially bounded by the first and second resilient walls; and
    first and second deformable walls, each being hollow, extending axially between the first and second resilient walls at circumferentially spaced locations and each having an edge forced into abutting, unbonded contact with the sleeve or first anchor part so as to divide the enclosed space into first and second chambers for hydraulic fluid; and
    a passageway interconnecting the first and second chambers for flow of hydraulic fluid therethrough.

2. A hydraulically damped mounting device according to claim 1 in which the resilient walls are in the shape of hollow frusto-cones with their frustums at the first anchor part and their bases at the second anchor part.

3. A hydraulically damped mounting device according to claim 2 in which the frusto-cones open in opposite axial directions.

4. A hydraulically damped mounting device according to claim 1, in which the resilient walls extend substantially completely around the first anchor part.

5. A hydraulically damped mounting device according to claim 1 in which said first and second deformable walls are hollow.

6. A hydraulically damped mounting device according to claim 5 in which the resilient walls contain a gap aligned with the hollow interior of said first and second deformable walls.

7. A hydraulically damped mounting device according to claim 1, in which said first anchor part is offset radially from the central longitudinal axis of the second anchor part.

8. A hydraulically damped mounting device according to claim 1, in which said first and second deformable walls have a V-shaped cross section, with a base of the V contacting said sleeve.

* * * * *

UNITED STATES PATENT AND TRADEMARK OFFICE
CERTIFICATE OF CORRECTION

PATENT NO.    : 6,276,671 B1
DATED         : August 21, 2001
INVENTOR(S)   : Peter Michel Trewhella Fursdon and John Philip West It is certified that error appears in the above-identified patent and that said Letters Patent is hereby corrected as shown below:

Title page,
The title page showing the illustrative figure should be deleted to be replaced with the attached title page.

Drawings,
In the drawings, sheets 1-4, consisting of Figures 1-6, should be deleted to be replaced with the corrected Figures 1-6, as shown on the attached pages.

Column 4,
Line 62, delete "deformable" and insert -- resilient --.

Column 5,
Line 1, delete "referable" and insert -- preferable --.

Signed and Sealed this

Thirtieth Day of July, 2002

Attest:

Attesting Officer

JAMES E. ROGAN
Director of the United States Patent and Trademark Office

(12) United States Patent
Fursdon et al.

(10) Patent No.: US 6,276,671 B1
(45) Date of Patent: *Aug. 21, 2001

(54) HYDRAULICALLY DAMPED MOUNTING DEVICE

(75) Inventors: Peter Michael Trewhella Fursdon, Bradford-on-Avon; John Philip West, Newark, both of (GB)

(73) Assignee: Avon Vibration Management Systems Limited, Wiltshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,751

(22) Filed: Oct. 29, 1998

(51) Int. Cl.[7] ............................................. F16F 5/00
(52) U.S. Cl. ................................. 267/140.12; 267/293
(58) Field of Search ........................ 267/140.12, 140.11, 267/141.2, 141.3, 141.4, 292, 293; 248/562, 636

(56) References Cited

U.S. PATENT DOCUMENTS

| | | |
|---|---|---|
| 4,786,036 | 11/1988 | Kanda . |
| 4,896,868 * | 1/1990 | Thelamon et al. ............... 267/140.12 |
| 4,971,456 | 11/1990 | Hori . |
| 4,982,938 | 1/1991 | Brenner . |
| 5,013,012 * | 5/1991 | Jouade ........................... 267/140.12 |
| 5,123,633 | 6/1992 | Kanda . |
| 5,184,803 | 2/1993 | Tanabe et al. . |
| 5,299,788 * | 4/1994 | Kanda ............................. 267/140.12 |
| 5,509,643 * | 4/1996 | Carstens et al. ............... 267/140.12 |
| 5,516,083 | 5/1996 | Sprang et al. . |
| 5,711,513 * | 1/1998 | Bretaudeau et al. ............ 267/140.12 |

FOREIGN PATENT DOCUMENTS

| | | |
|---|---|---|
| 3810310 | 8/1990 | (DE) . |
| 41 16 706 A1 | 11/1991 | (DE) . |
| 43 32 367 C2 | 3/1995 | (DE) . |
| 0 248 714 A1 | 12/1987 | (EP) . |
| 0172700 | 11/1988 | (EP) . |
| 0335007 | 10/1989 | (EP) . |
| 0418671 | 3/1991 | (EP) . |
| 0335005 | 6/1992 | (EP) . |
| 1242965 | 8/1971 | (GB) . |
| 2193553 | 2/1988 | (GB) . |
| 2195166 | 3/1988 | (GB) . |
| 2291691 | 1/1996 | (GB) . |
| 2298018 | 8/1996 | (GB) . |
| 2298019 | 8/1996 | (GB) . |

* cited by examiner

*Primary Examiner*—Matthew C. Graham
*Assistant Examiner*—Pamela J. Rodriguez
(74) *Attorney, Agent, or Firm*—Cook, Alex, McFarron, Manzo, Cummings & Mehler, Ltd.

(57) ABSTRACT

A bush-type hydraulically damped mounting device has two telescoped anchor parts. Resilient walls, spaced apart axially, extend between the anchor parts. Deformable walls, spaced apart circumferentially, extend axially between the resilient walls, to define first and second chambers for hydraulic fluid. The deformable walls make abutting unbonded contact with one or other of the anchor parts.

8 Claims, 4 Drawing Sheets